United States Patent [19]
Luppino

[11] Patent Number: 5,942,979
[45] Date of Patent: Aug. 24, 1999

[54] ON GUARD VEHICLE SAFETY WARNING SYSTEM

[76] Inventor: Richard Luppino, 4 Curtis St., Centereach, N.Y. 11720

[21] Appl. No.: 08/835,332

[22] Filed: Apr. 7, 1997

[51] Int. Cl.$^6$ .................................................. G08B 23/00
[52] U.S. Cl. .......................... 340/576; 340/439; 180/272
[58] Field of Search .................................... 340/575, 576, 340/439, 573, 539; 128/671, 668, 706, 708; 180/271, 272; 364/424.04

[56] References Cited

U.S. PATENT DOCUMENTS

| | | | |
|---|---|---|---|
| 3,658,054 | 4/1972 | Iberall | 128/DIG. 4 |
| 3,824,538 | 7/1974 | Slemp | 340/576 |
| 3,947,815 | 3/1976 | Muncheryan | 340/576 |
| 4,093,945 | 6/1978 | Collier et al. | 340/576 |
| 4,572,207 | 2/1986 | Yoshimi et al. | 128/706 |
| 4,665,385 | 5/1987 | Henderson | 340/576 |
| 4,706,072 | 11/1987 | Ikeyama | 340/575 |
| 4,784,162 | 11/1988 | Ricks et al. | 128/668 |
| 4,836,219 | 6/1989 | Hobson et al. | 340/576 |
| 5,311,877 | 5/1994 | Kishi | 340/575 |
| 5,402,109 | 3/1995 | Mannik | 340/576 |
| 5,488,353 | 1/1996 | Kawakami et al. | 340/576 |
| 5,521,580 | 5/1996 | Kaneko et al. | 340/439 |
| 5,543,797 | 8/1996 | Hochstein et al. | 340/825.34 |

*Primary Examiner*—Jeffery A. Hofsass
*Assistant Examiner*—Van T. Trieu
*Attorney, Agent, or Firm*—Michael I. Kroll

[57] ABSTRACT

An on guard vehicle warning system (10) for monitoring bodily conditions of an operator of the vehicle. The vehicle warning system comprises a sensor device (12) and an analysis device (20) contained within the dashboard (18) of the vehicle. The sensor device (12) includes at least one sensing device (44) for placement on the body of the operator and monitoring a bodily condition of an operator of the vehicle and a signal generator for generating a signal indicative of the sensed condition. A transmitter (48) is connected to transmit the generated signal to the analysis device (20). The analysis device (20) includes a processing circuit/comparator (56) and (58) for analyzing the signal received from the sensor device, determining whether an emergency situation exists and generating one of a first signal indicative of a safe or non-emergency situation and a second signal indicative of an emergency situation. The generated signal is transmitted to a display unit (26) for visually indicating a safe situation upon receipt of the first signal and to both the display unit (26) and car speakers (24) for audibly and visually indicating an emergency situation exists upon receipt of the second signal. The processing circuit can also send a signal to the horn (30) and emergency lights (28) to activate both, thereby alerting people in the vicinity as to an emergency situation. A signal can also be transmitted to the brake system (32) and/or a fuel metering valve (36) to bring the vehicle to a safe stop.

16 Claims, 6 Drawing Sheets

ON GUARD VEHICLE SAFETY WARNING SYSTEM

BACKGROUND OF THE INVENTION

1. Field of the Invention

The instant invention relates generally to safety warning and monitoring control systems and, more specifically, to a device for monitoring the bodily conditions of an operator of a motor vehicle and safely stopping the vehicle during an emergency situation.

2. Description of the Prior Art

Numerous warning systems for monitoring body conditions and safety devices for placement in motor vehicles are provided in the prior art For example, U.S. Pat. Nos. 3,824,538; 3,947,815; 4,784,162; and 4,836,219 are all illustrative of such prior art While these units may be suitable for the particular purpose to which they address, they would not be as suitable for the purposes of the present invention as heretofore described.

U.S. Pat. No. 3,824,538

Inventor: Cecil Slemp

Issued: Jul. 16, 1974

A motor vehicle operator monitoring system having control interlocks to disable an operated vehicle in graduated stages when the vehicle operator is found to have impaired faculties, including a system insuring that the operator periodically submits to testing on penalty of vehicle disablement, a system assessing test results to warn the vehicle operator, the public, and to bring the vehicle to a safe gradual stop taking terrain into account.

U.S. Pat. No. 3,947,815

Inventor: Hrand M. Muncheryan

Issued: Mar. 30, 1976

An emergency alarm system for automobiles for signaling passersby and police that the driver or the occupant of the car needs immediate help due to a sudden attack of illness, heart trouble, stroke, or intrusion by burglars or other criminals is described. The system comprises an alarm and light-flashing device actuated by manually-operated switches located at various readily-accessible parts of the car, or triggered automatically from an alarm-triggering device carried on the shirt pocket of the car driver or occupant The system also serves to keep the driver awake during a longdistance and tiresome driving trip by intermittently sounding an alarm contained in a driver's cap and connected to the present emergency alerting system, when the driver has the tendency to become drowsy.

U.S. Pat. No. 4,784,162

Inventor: Robert D. Ricks

Issued: Nov. 15, 1988

A data monitoring system which simultaneously monitors, transmits by radio and records data relating to a plurality of physiological parameters comprises a portable sensor unit which is worn by the patient and includes a plurality of sensors attached to the patient's body each of which monitors a physiological parameter and generates a corresponding electrical signal, a circuit pack which converts the signals into a series stream of digital data and a transmitter which periodically transmits the data. A base station includes both a receiver which receives the transmitted data and reconverts it to a digital signal and a data processing unit which records the data.

U.S. Pat. No. 4,836,219

Inventor: J. Allan Hobson et al.

Issued: Jun. 6, 1989

Electronic filters are applied to analog signals representative of eye movement and head movement, obtained from detectors attached to a simple headgear, to provide satisfactory information for automatically reporting an individual's sleep state. The filters determine whether there has been substantial eye and head movement in a given period. Each filter then generates binary output signals representing movement (or the absence of it). Noise filters and a comparison filter are then applied to the binary output signals to predict sleep state; REM sleep; NREM sleep; or wakefulness.

BRIEF SUMMARY OF THE INVENTION

The present invention is concerned with safety warning and monitoring control systems and, more specifically, to monitoring the bodily conditions of an operator of a motor vehicle and safely stopping the vehicle during an emergency situation while warning others of the operator's condition.

A primary object of the present invention is to provide an on guard vehicle safety warning system able to monitor physical conditions of an operator.

A further object of the present invention is to provide an on guard vehicle safety warning system for preventing vehicle operators suffering from seizure disorders, heart conditions, diabetes or other debilitating illnesses from injuring themselves or others in the event of an attack while operating the vehicle.

Another object of the present invention is to provide an on guard vehicle safety warning system able to determine if an emergency situation exists.

A still further object of the present invention is to provide an on guard vehicle safety warning system able to warn operators of vehicles in the vicinity of the affected operator that an emergency situation exists.

Another object of the present invention is to provide an on guard vehicle safety warning system able to warn occupants of the endangered vehicle that an emergency situation exists.

A further object of the present invention is to provide an on guard vehicle safety warning system able to safely apply the brakes of the vehicle upon determination of an emergency situation causing the vehicle to come to a safe stop.

An even further object of the present invention is to provide an on guard vehicle safety warning system able to gradually reduce the fuel supplied to the engine of the vehicle until the vehicle comes to a stop.

A still further object of the present invention is to provide an on guard vehicle safety warning system which can monitor the heart of an operator of a vehicle.

An even further object of the present invention is to provide an on guard vehicle safety warning system able to monitor the brain activity of an operator of a vehicle.

A yet further object of the present invention is to provide an on guard vehicle safety warning system able to monitor the pulse rate of an operator of a vehicle.

A still further object of the present invention is to provide an on guard vehicle safety warning system having sensors for monitoring the brain activity of an operator contained within glasses worn by the operator.

An even further object of the present invention is to provide an on guard vehicle safety warning system having both personal and commercial applications.

An on guard vehicle warning system for monitoring bodily conditions of an operator of the vehicle is disclosed. The vehicle warning system comprises a sensor device placed on the body of the operator and an analysis device contained within the dashboard of the vehicle. The sensor device includes at least one sensing device for placement on the body of the operator and monitoring a bodily condition of an operator of the vehicle and a signal generator for generating a signal indicative of the sensed condition. A transmitter is connected to transmit the generated signal to the analysis device. The analysis device includes a processing circuit for analyzing the signal received from the sensor device, determining whether an emergency situation exists and generating one of a first signal indicative of a safe or non-emergency situation and a second signal indicative of an emergency situation. The generated signal is transmitted to a display unit for visually indicating a safe situation upon receipt of the first signal and to both the display unit and car speakers for audibly and visually indicating an emergency situation exists upon receipt of the second signal. The processing circuit can also send a signal to the horn and emergency lights to activate both, thereby alerting people in the vicinity as to an emergency situation. A signal can also be transmitted to the brake system and/or a fuel metering valve to bring the vehicle to a safe stop.

The foregoing and other objects, advantages and characterizing features will become apparent from the following description of certain illustrative embodiments of the invention.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Turning now descriptively to the drawings, in which similar reference characters denote similar elements throughout the several views, the Figures illustrate a vehicle safety warning system of the present invention. With regard to the reference numerals used, the following numbering is used throughout the various drawing figures.

10 vehicle safety warning system of the present invention
12 sensor unit for head
14 heart monitor sensor unit
16 heart rate sensor unit for wrist
18 car dashboard
20 microprocessor
22 power supply
24 car speaker
26 display
28 vehicle emergency lights
30 vehicle horn
32 vehicle brake system
36 vehicle fuel metering valve
36 reset button
38 transponder
40 reset button
42 sensor battery
44 sensor/signal generator
46 multiplexer
48 transmitter
50 transmitter antenna
52 receiver antenna
54 receiver
56 comparator
58 signal generator
60 amplifier
62 delay circuit
64 three position switch
LED "no emergency" indicator
68 LED "emergency" indicator

DETAILED DESCRIPTION OF THE PREFERRED EMBODIMENT

Referring now to FIGS. 1–4, a preferred embodiment of the on guard vehicle safety warning system of the present invention is illustrated.

Figure 1:
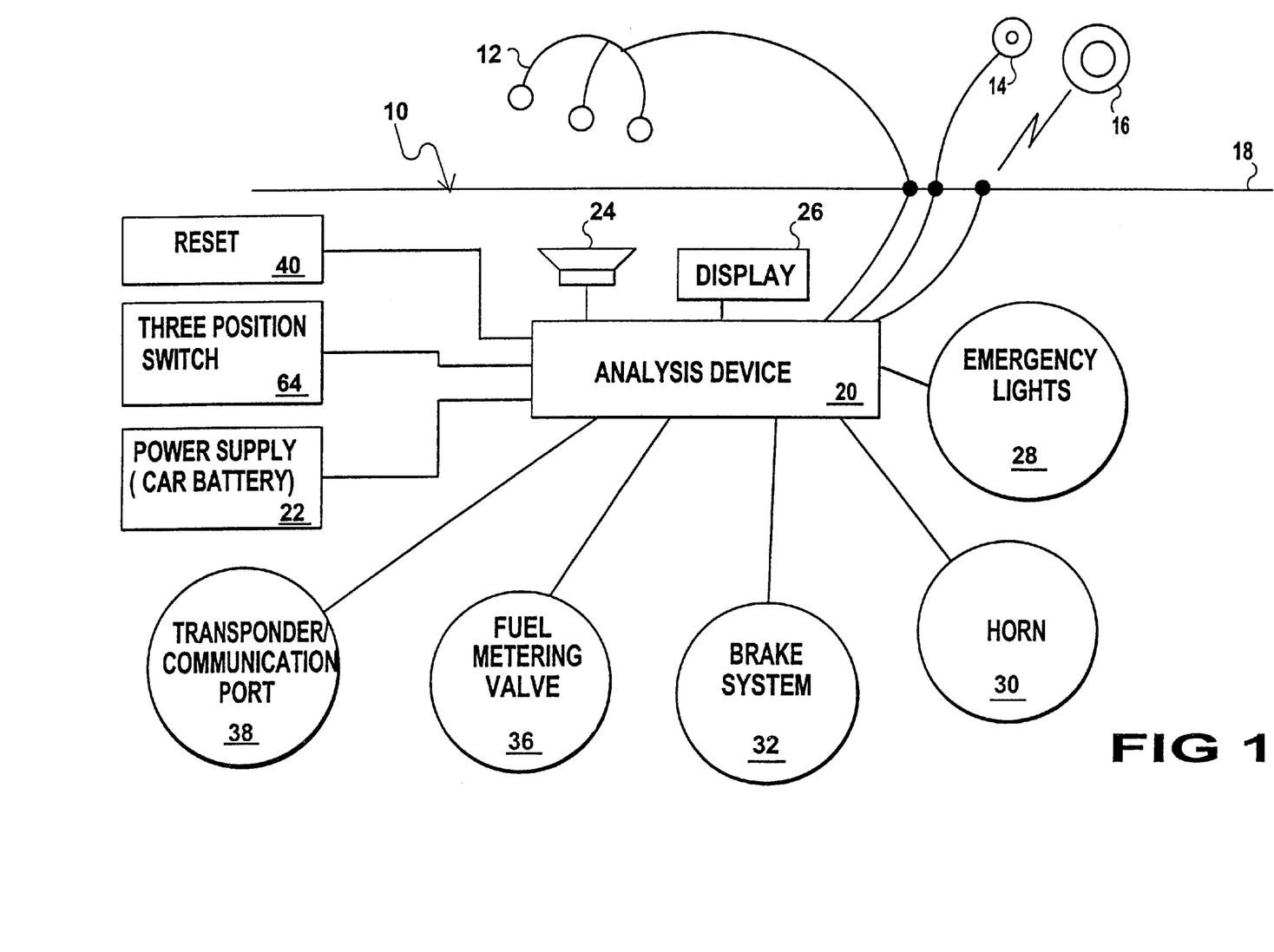
FIG. 1 is a schematic diagram illustrating the on guard vehicle safety warning system of the present invention.

Specifically, FIG. 1 shows the vehicle safety warning system indicated generally by the numeral 10. The system 10 includes an analysis device or microprocessor 20 and at least one of a brain activity monitoring sensor 12 for placement on the head of the vehicle operator, a heart rate monitor 14 for placement on a chest area of the vehicle operator and a pulse monitor 16 for placement about the wrist of the vehicle operator. These sensor devices 12, 14 and 16 may be hardwired to connection ports on the dashboard 18 of the vehicle or may include a transmitter for wireless communication with the analysis device 20. Wireless communication between the sensor devices 12, 14 and 16 and the analysis device 20 is preferred as the wire associated with a hardwired system may inhibit the ability of the vehicle operator to control the vehicle.

The analysis device 20 is contained within the dashboard 18 of the vehicle. It is connected to receive sensor signals from at least one of the brain activity monitoring sensor 12, heart rate monitor 14, and pulse monitor 16. The analysis device 20 receives power from a power source 22 which may be the vehicle battery or a separate self contained power source. Based upon analysis of the signals received from the sensors 12,14, and 16 the analysis device 20 will control an alarm 24 and a display 26 within the vehicle. The analysis device 20 is also connected to the emergency lights 28, horn 30, brake system 32, a fuel metering valve 36 and a transponder 38. Upon determination of an emergency situation the analysis device 20 will control these devices in a manner which would cause the vehicle to come to a safe stop and alert other vehicles in the vicinity of the emergency situation as will be explained hereinafter. The transponder 38 is connected to the analysis device 20 for transmitting a distress signal to emergency units such as hospitals and police stations upon determination of an emergency situation.

A delay circuit 62 and three position toggle switch 64 are also connected to the analysis device 20. The delay circuit 62 provides a delay between determination of an emergency situation and transmission of the control signals to the other components allowing for correction in case of a false emergency situation determination. The toggle switch 64 allows the operator to place the system in a desired operating mode, a TEST mode to check if the unit is operating properly; an ON mode to place the unit in normal operation; and an EMERGENCY mode to manually begin operation of the warning procedures as will be described in more detail hereinafter. A reset button 40 is also included to halt operation of the system, i.e. reset the system, should a false emergency situation be detected.

Figure 2:
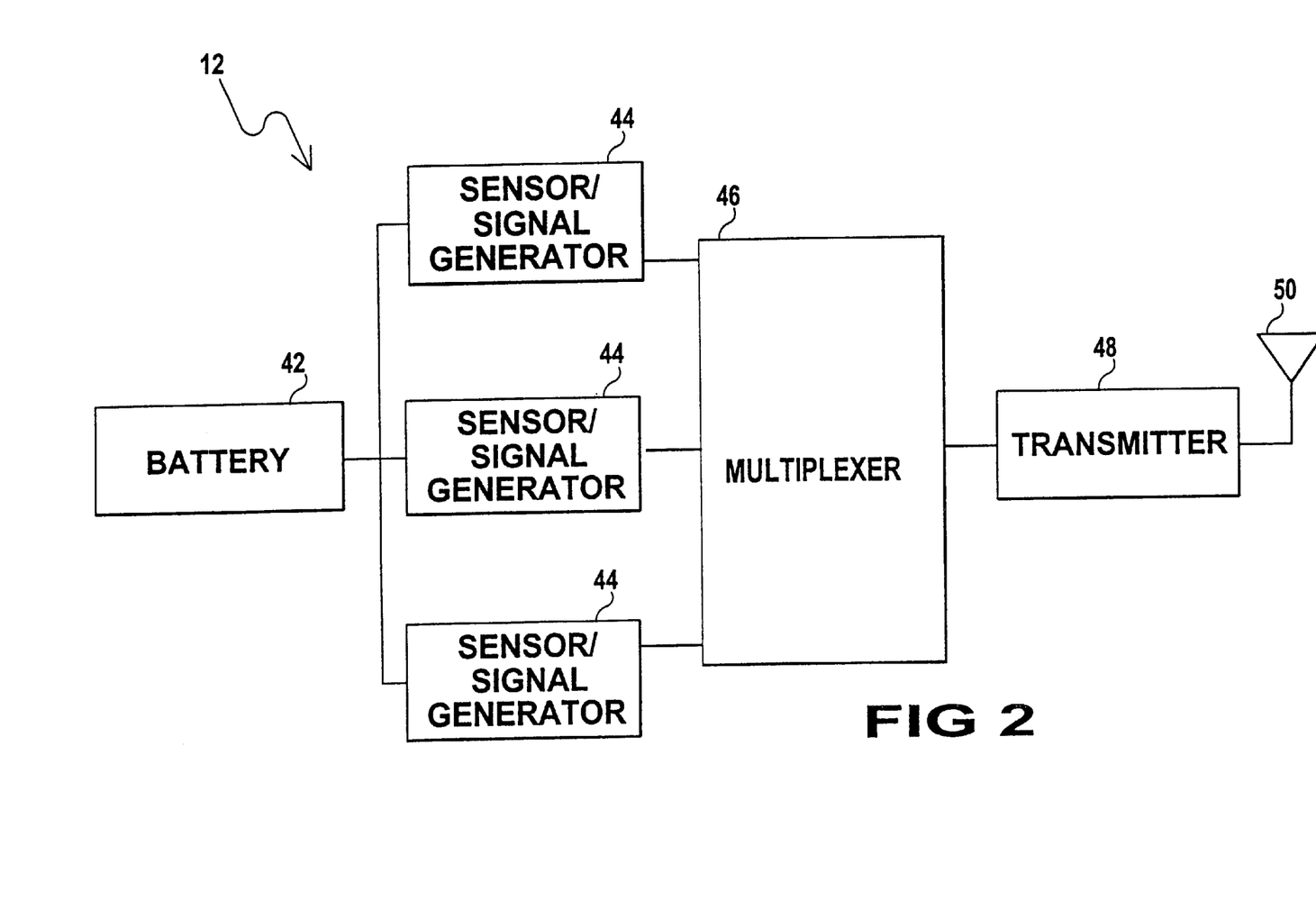
FIG. 2 is a schematic diagram of a sensor unit of the on guard vehicle safety warning system of the present invention.

FIG. 2 illustrates the brain activity monitoring sensor 12 in more detail. The sensor 12 includes a battery or power source 38 and three sensors/signal generators 40. Each sensor/signal generator 40 is for placement at a particular position on the head of the vehicle operator for monitoring brain activity. The sensors of the brain activity sensor 12 may be accommodated by a pair of glasses which when placed on the operators head correctly positions the sensors for monitoring. The sensors/signal generators 40 each generate a signal based upon the sensed activity and send these signals to a multiplexer 42 in which they are combined. The multiplexer 42 may be connected to a transmitter 44 and antenna 46 for wirelessly transmitting the combined signals to the analysis device 20 or may be hardwired to the dashboard 18 for connection with the analysis device 20 as depicted in FIG. 1. It is to be understood that the heart rate sensor 14 and the wrist pulse rate sensor 16 are identical in structure and function although they may include less than three sensors and not include a signal multiplexer. The wrist pulse rate sensor may be accommodated in a wrist band for retaining the sensor in the correct position on the wrist of the operator.

Figure 3:
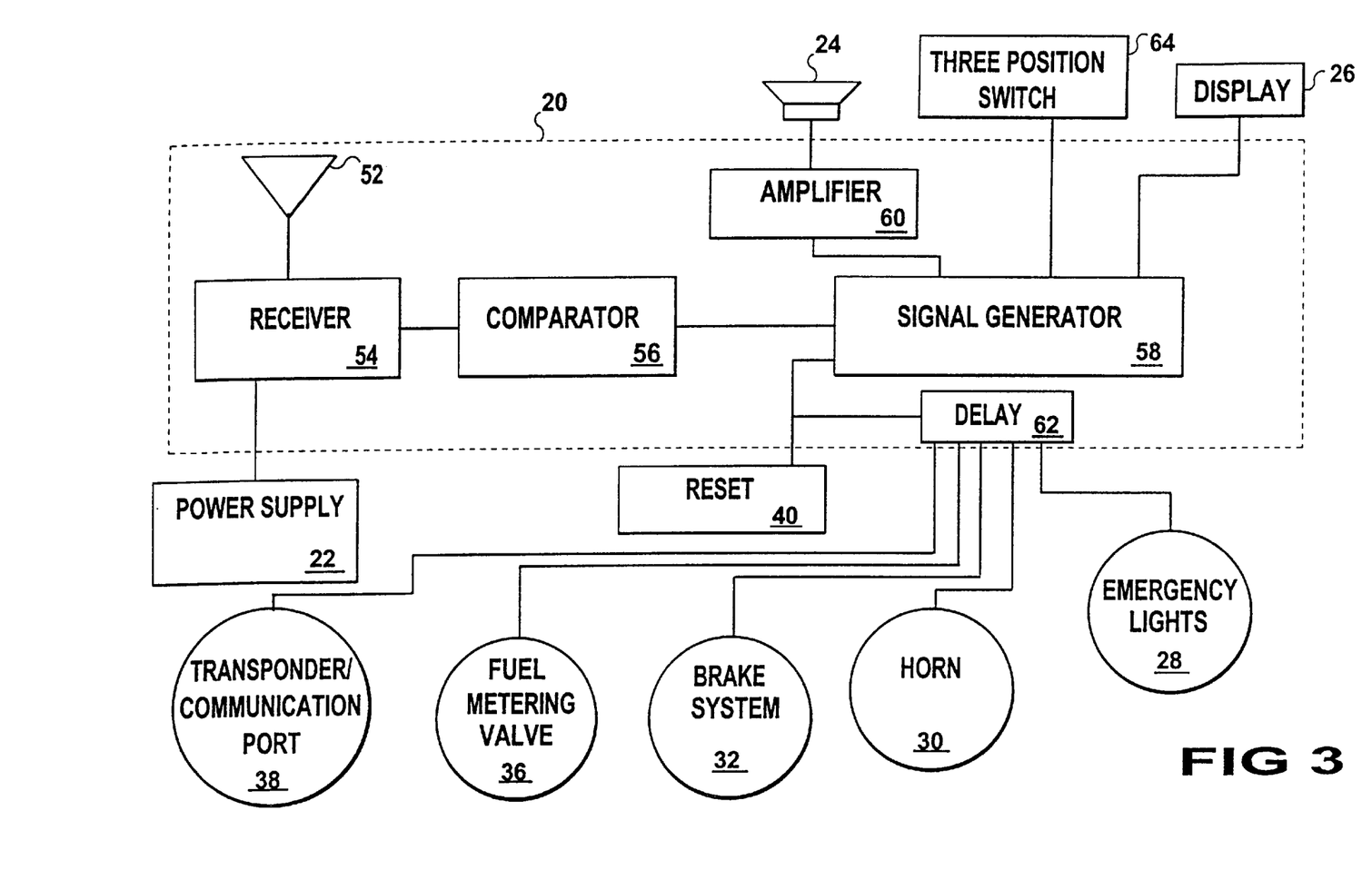
FIG. 3 is a schematic diagram of the base unit of the on guard vehicle safety warning system of the present invention.
Figure 4:
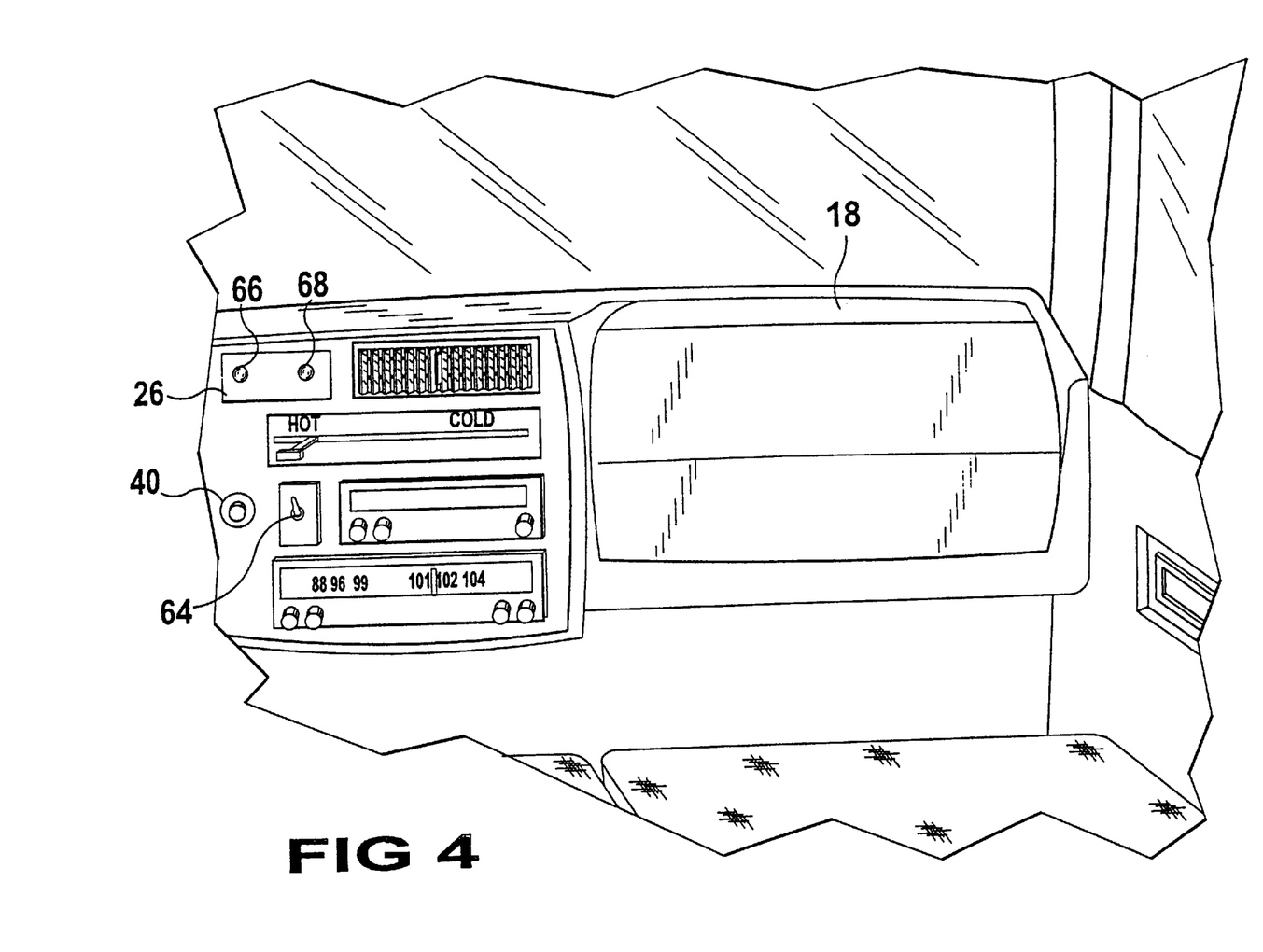
FIG. 4 is an illustration of the dashboard of the vehicle including the on guard vehicle safety warning system of the present invention.

As illustrated in FIG. 3, the analysis device 20 may be comprised of an antenna 52 and receiver 54 for receiving wirelessly transmitted signals from the sensor device 12, 14 or 16 and a comparator 56 for analyzing the received signals and determining if an emergency situation exists based on the analysis. The resultant signal from the comparator 56 is directed to a signal generator 58. The signal generator 58 generates a signal based upon the comparison performed by the comparator 56 and is connected to transmit the generated signal to an amplifier 60 connected to the alarm 24 within the vehicle, the display 26 within the vehicle and a delay circuit 62. The delay circuit 62 provides a short period, e.g. 5 seconds, for the operator to disconnect or reset the system should a false emergency situation be detected. A reset button 40 is provided for this purpose. If the delay time elapses and the reset button 40 has not been activated, a signal is transmitted to emergency lights 28, horn 30, brake system 32, fuel metering valve 36 and transponder 38. These devices connected to the analysis device 20 act to alert others and control the vehicle in an emergency situation. The comparator 56 and signal generator 58 may be replaced by a microprocessor unit or any other device or combination which performs the same function.

While a preferred structure for the analysis device 20 is shown and described herein, those of ordinary skill in the art who have read this description will appreciate that there are numerous other structures for the analysis device 20 and, therefore, as used herein the phrase "analysis means for receiving and analyzing transmitted signal and determining if an emergency situation exists" should be construed as including all such structures as long as they achieve the desired result of receiving and analyzing a transmitted signal and determining if an emergency situation exists, and therefore, that all such alternative mechanisms are to be considered as equivalent to the one described herein.

Upon a determination that no emergency situation exists the "no emergency" indicator or LED 66 on the display 26 is caused to illuminate by a control signal received from the signal generator 54. The display 26 is most clearly illustrated in FIG. 4. The dashboard display unit 26 also includes an "emergency" indicator or LED 68. Upon determination of an emergency situation by the comparator 52, the signal generator 54 sends a signal to the dashboard display unit 26 which causes the "emergency" indicator or LED 68 to illuminate and the alarm 24 to produce an audible alarm signal thereby alerting any other occupants of the vehicle as to the emergency situation. The car audio speakers may be used to produce the audible alarm. This allows the operator to be notified of the emergency situation determination and to reset the system during the delay period prior to the other devices connected to the signal generator 58 are activated by engaging the reset button 40. The reset button 40 is in an easily accessible position on the dashboard 18. Also positioned on the dashboard 18 is a three position toggle switch 64. This toggle switch 64 allows the operator to select the mode of operation for the system. The operator can select from a TEST mode for testing the system, an ON mode for normal operation of the device and an EMERGENCY mode for manually activating the alarms and vehicle controls of the system.

Figure 5:
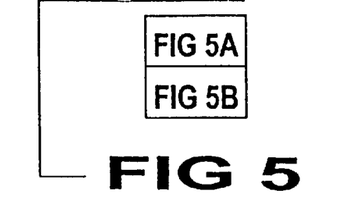
FIGS. 5a and 5b are flow chart describing operation of the on guard vehicle safety warning system of the present invention.
Figure 5A:
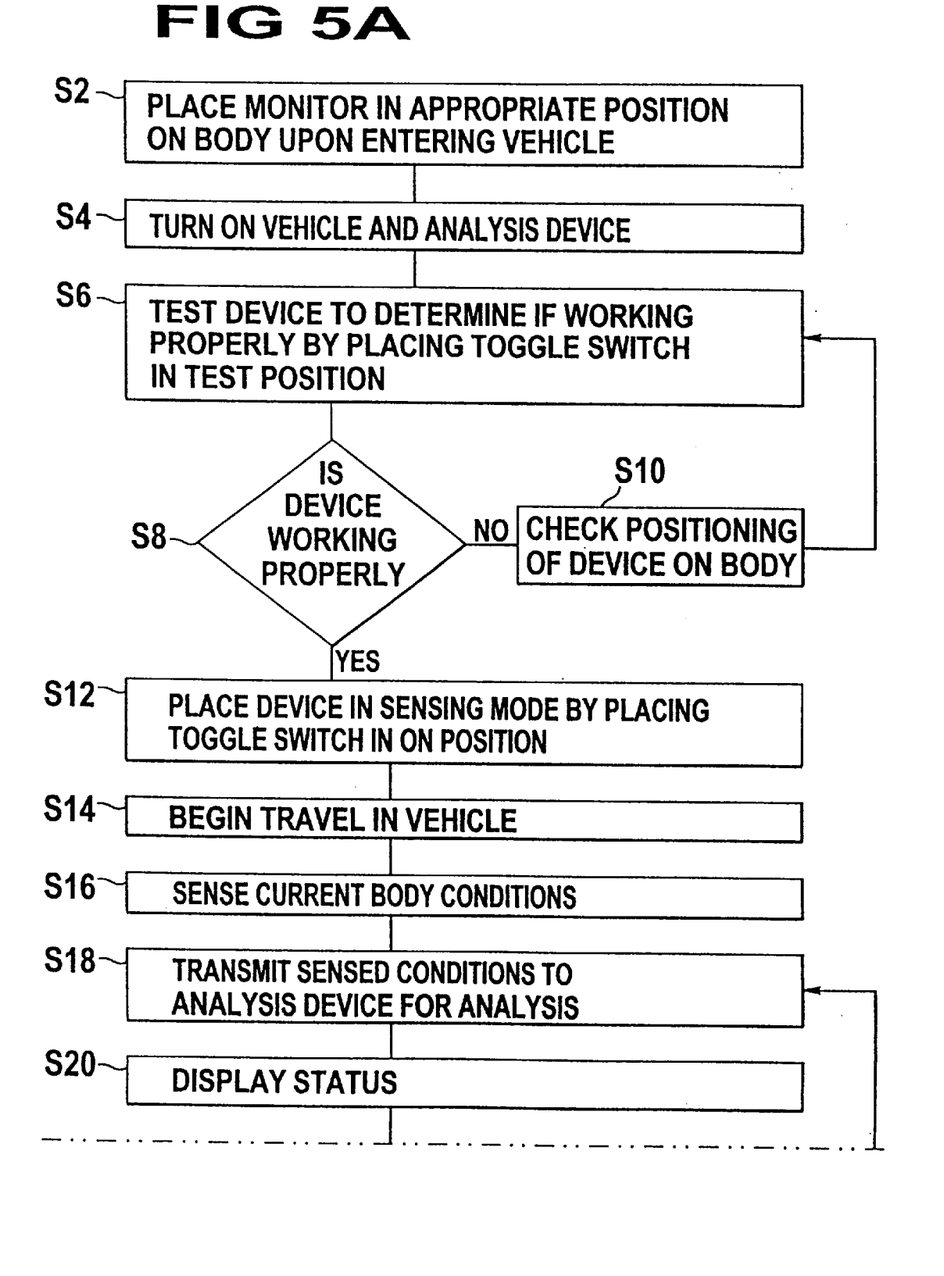
Figure 5B:
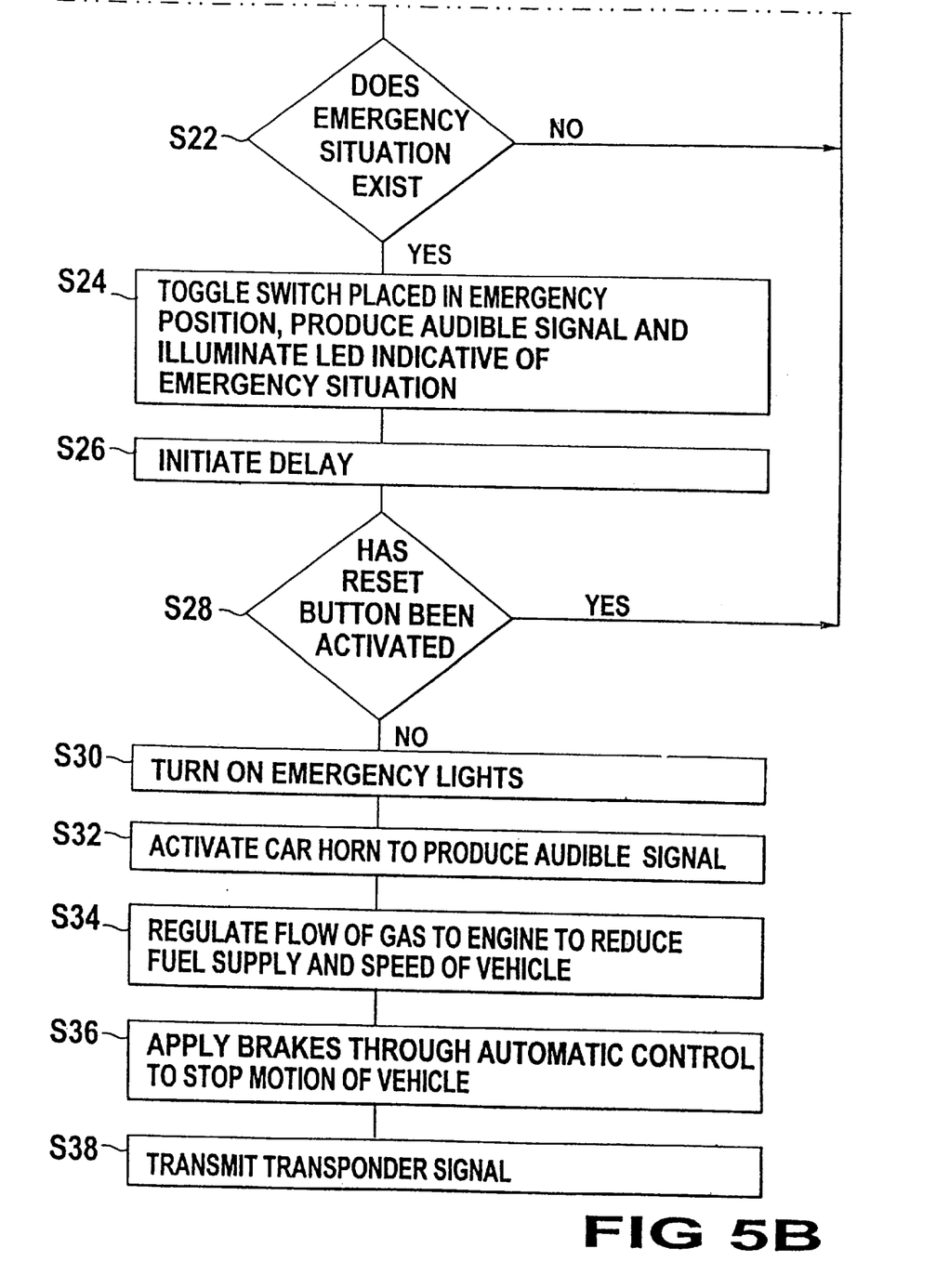

The operation of the vehicle warning system 10 will now be described with reference to the flow chart of FIG. 5. In operation, at least one of the sensors 12, 14 and 16 are placed in the appropriate position on the body of the vehicle operator upon entering the vehicle, as described in step S2. The brain activity sensor 12 is placed in position on the operators head, the heart monitor 14 on the chest and the pulse monitor 16 around the wrist If the monitors are hardwired, they are then connected to the dashboard 18 through connection ports therein and thus connected to the processor 20.

The vehicle is then started and as the analysis device 20 is connected to receive power from the vehicle battery 22, the analysis unit 20 turns on, as described in step S4. The system 10 is then tested by placing the toggle switch 64 in the test position to determine if it is operating properly. This will result in the illumination of the "no emergency" light on the display 26, as described in steps S6 and S8. If an incorrect signal is indicated by the display 26, the operator should check the positioning of the sensor on the body and adjust the sensing device until a correct signal is received, as described in step S10. It is now safe to operate the vehicle.

The toggle switch is now placed in the ON position and the system is operating in a sensing mode, step S12. The vehicle may now be operated, as described in step S14. During operation of the vehicle, the bodily conditions are continuously sensed and signals indicative of the sensed conditions are continuously transmitted from the sensing unit 12, 14 or 16 to the analysis device 20, as described in steps S16 and S18. The comparator 56 compares the received signals to stored values indicative of an emergency situation to determine if an emergency situation exists. Upon determining no emergency exists, the signal generator 58 produces a signal indicative thereof and transmits the generated signal to the display unit and the "no emergency" indicator is illuminated, step S20. The sensor and analysis device 20 continue to monitor the sensor signals to determine if an emergency situation exists, step S22.

Upon determining an emergency situation exists, the signal generator 58 will produce a signal indicative thereof and transmit the generated signal to the alarm 24 and display unit 26 thereby producing an audible signal and causing the "emergency" light 62 to become illuminated, see step S24. The operator may also initiate activation of the alarms manually by placing the toggle switch 64 in the EMERGENCY mode, also see step S24. The signal generator 58 will also transmit a signal to the delay circuit 62 thereby initiating a delay until activation of the other components, see step S26. This delay allows the operator and passengers to be notified of the emergency situation determination. If the determination was in error, the operator has time to press the reset button 40 and thus reset the system 10 as described in step S28. If the reset button 24 has been activated, the system will return to the status of sensing current bodily conditions in step S16.

If the reset button 40 has not been activated and the delay time has elapsed, a signal is delivered to the hazard/emergency lights 28 causing them to turn on and flash, as described in step S30, and to the horn 30 to produce an audible alarm, step S32. This will notify operators of other vehicles in the vicinity of the impending danger and the emergency situation. The connections between the analysis device 20 and both the emergency lights 28 and the horn 30 causing the lights to flash and horn to produce an audible signal are well known in the art and thus further discussion of such is not deemed necessary. At the same time the microprocessor transmits a signal to a fuel metering valve 36 which, in response to the received signal, reduces and subsequently cuts off the flow of gas to the engine causing the speed of the vehicle to be reduced, step S34. A signal can also be transmitted to the brake system 32, activating the brakes and causing the vehicle to stop in a controlled manner, step S30. The vehicle is thus caused to stop, step S36. The control of the fuel supply to the engine and the remote application of the brakes are both known in the art and further discussion of such is not deemed necessary. A signal is also sent to a transponder circuit 38 which will transmit a distress signal to emergency units such as hospitals and police in the area to notify them of the emergency situation, step S38. The sounding of the alarms will continue until power is cut off to the analysis circuit 20 such as by turning off the vehicle.

It will be understood that each of the elements described above, or two or more together, may also find a useful application in other types of applications differing from the type described above.

While the invention has been illustrated and described as shown in the drawings, it is not intended to be limited to the details shown, since it will be understood that various omissions, modifications, substitutions and changes in the forms and details of the formulation illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of this invention.

What is claimed and desired to be protected by Letters Patent is set forth in the appended claims:

1. An on guard vehicle warning system for monitoring bodily conditions of an operator of the vehicle, said vehicle warning system comprising:
   a) monitoring means including:
      sensor means for monitoring the operator of the vehicle for seizure disorders, heart conditions, diabetes or other debilitating illnesses and generating a signal indicative of the sensed condition; and
      transmitter means connected to said sensor means for receiving said generated signal and transmitting said signal;
   b) analysis means for receiving and analyzing said transmitted signal and determining if said transmitted signal is indicative of an emergency situation, including:
      receiver means for receiving said transmitted signal from said sensor means;
      processing means connected to said receiver means for analyzing said transmitted signal to determine if said emergency situation exists;
      signal generator means for generating one of a first signal indicative of a safety situation upon said processing means determining said emergency situation does not exist and a second signal indicative of said emergency situation upon said processing means determining said emergency situation exists; and
      display means connected to said signal generator for visually indicating said emergency situation does not exist upon receipt of said first signal from said signal generator means and audibly and visually indicating said emergency situation exists upon receipt of said second signal from said signal generator means;
   c) means for taking action in response to receipt of said second signal that an emergency situation exists to halt operation of said vehicle and provide horn and light signals external to said vehicle announcing the presence of an emergency situation; and
   d) means comprising a delay circuit for allowing a visual and audible display to notify the operator that an emergency situation exists and action is about to be taken and delaying said action for a predetermined period of time to allow said operator to cancel said action.

2. An on guard vehicle warning system as recited in claim 1, wherein said sensor means includes first, second and third sensors positioned about a head of the operator for monitoring brain activity of the operator.

3. An on guard vehicle warning system as recited in claim 1, wherein said sensor means includes a first sensor positioned about a chest of the operator for monitoring a heart rate of the operator.

4. An on guard vehicle warning system as recited in claim 1, wherein said sensor means includes a first sensor positioned about a wrist of the operator for monitoring a pulse rate of the operator.

5. An on guard vehicle warning system as recited in claim 1, wherein said processing means includes a comparator for comparing said transmitted signal with a predetermined reference signal indicative of said emergency situation.

6. An on guard vehicle warning system as recited in claim 1, further comprising a toggle switch for placing said system in one of a test mode, an on mode and an emergency mode.

7. An on guard vehicle warning system as recited in claim 6, further comprising a reset button for said driver for resetting said system after a false determination of said emergency situation.

8. An on guard vehicle warning system as recited in claim 7, further comprising an emergency light system connected to said signal generator means for illuminating to indicate said emergency situation upon receipt of said second signal from said signal generator.

9. An on guard vehicle warning system as recited in claim 8, further comprising a horn connected to said signal generator means for producing an audible signal to indicate said emergency situation upon receipt of said second signal from said signal generator.

10. An on guard vehicle warning system as recited in claim 9, further comprising a vehicle braking system connected to said signal generator means for decreasing a speed of the vehicle upon receipt of said second signal from said signal generator.

11. An on guard vehicle warning system as recited in claim 1, further comprising a transponder connected to said signal generator means for transmitting a distress signal upon receipt of said second signal from said signal generator.

12. An on guard vehicle warning system as recited in claim 1, wherein said analysis means is positioned within a dashboard of said vehicle.

13. An on guard vehicle warning system as recited in claim 1, wherein said display means includes a first LED for indicating a non emergency situation and a second LED for indicating an emergency situation.

14. An on guard vehicle warning system as recited in claim 13, wherein said display means further includes a speaker for audibly indicating said emergency situation.

15. An on guard vehicle warning system as recited in claim 1, further comprising wire means for connecting said monitoring means to said analysis means.

16. An on guard vehicle warning system as recited in claim 1, wherein said signal indicative of the sensed condition is wirelessly transmitted to said analysis means.

* * * * *